United States Patent
Chandrashekar

(10) Patent No.: US 10,337,554 B2
(45) Date of Patent: Jul. 2, 2019

(54) CROSSHEAD FOR A PISTON ROD

(71) Applicant: Nuovo Pignone Srl, Florence (IT)

(72) Inventor: Manjunatha Mugulavalli Chandrashekar, Bangalore (IN)

(73) Assignee: Nuovo Pignone Srl, Florence (IT)

( * ) Notice: Subject to any disclaimer, the term of this patent is extended or adjusted under 35 U.S.C. 154(b) by 193 days.

(21) Appl. No.: 15/327,441

(22) PCT Filed: Jul. 1, 2015

(86) PCT No.: PCT/EP2015/064951
§ 371 (c)(1),
(2) Date: Jan. 19, 2017

(87) PCT Pub. No.: WO2016/001288
PCT Pub. Date: Jan. 7, 2016

(65) Prior Publication Data
US 2017/0219006 A1 Aug. 3, 2017

(30) Foreign Application Priority Data

Jul. 2, 2014 (IT) .............................. CO2014A0023

(51) Int. Cl.
*F16C 5/00* (2006.01)
(52) U.S. Cl.
CPC ..................... *F16C 5/00* (2013.01)
(58) Field of Classification Search
CPC ........ F01B 9/026; F04B 9/045; F04B 53/146; F16J 1/12
See application file for complete search history.

(56) References Cited

U.S. PATENT DOCUMENTS

| 753,024 | A | * | 2/1904 | White | F16C 11/045 |
| | | | | | 279/83 |
| 1,348,287 | A | | 8/1920 | McArthur | |
| 1,521,426 | A | | 12/1924 | Buettner | |
| 2,057,158 | A | * | 10/1936 | Moffitt | F16C 5/00 |
| | | | | | 123/71 R |
| 2,266,192 | A | * | 12/1941 | Grieshaber | F16C 5/00 |
| | | | | | 123/41.37 |
| 3,179,451 | A | | 4/1965 | Blank, Sr. | |
| 4,872,395 | A | * | 10/1989 | Bennitt | F16C 5/00 |
| | | | | | 92/139 |

(Continued)

FOREIGN PATENT DOCUMENTS

| CN | 1346942 A | 5/2002 | |
| EP | 0 393 770 A1 | 10/1990 | |
| EP | 1191240 A1 * | 3/2002 | F16C 5/00 |

OTHER PUBLICATIONS

Office Action issued in connection with corresponding EP Application No. 15732719.8 dated Feb. 5, 2018.

(Continued)

*Primary Examiner* — Michael Leslie
*Assistant Examiner* — Matthew Wiblin
(74) *Attorney, Agent, or Firm* — Baker Hughes Patent Operations

(57) ABSTRACT

A crosshead for a piston rod is provided, which comprises a main body having a first and a second seat. The first seat is configured to hold a connecting rod, and the second seat is configured to hold a piston rod. The main body is made as a single piece.

20 Claims, 5 Drawing Sheets

(56) References Cited

U.S. PATENT DOCUMENTS

| | | | | |
|---|---|---|---|---|
| 5,031,512 | A | * | 7/1991 | Graziani .................. F16C 5/00 |
| | | | | 92/139 |
| 2004/0223669 | A1 | | 11/2004 | Vicars |
| 2008/0006148 | A1 | * | 1/2008 | McKelroy ............. F04B 53/144 |
| | | | | 92/190 |
| 2010/0172778 | A1 | * | 7/2010 | Kugelev ................ F04B 9/045 |
| | | | | 417/437 |
| 2017/0122301 | A1 | * | 5/2017 | Brogle ....................... F16J 7/00 |

OTHER PUBLICATIONS

Italian Search Report and Written Opinion issued in connection with corresponding IT Application No. ITCO2014A000023 dated Dec. 19, 2014.

International Search Report and Written Opinion issued in connection with corresponding PCT Application No. PCT/EP2015/064951 dated Nov. 16, 2015.

International Preliminary Report on Patentability issued in connection with corresponding PCT Application No. PCT/EP2015/064951 dated Jan. 12, 2017.

Machine Translation and First Office Action and Search issued in connection with corresponding CN Application No. 201580041665.X dated Nov. 2, 2018.

* cited by examiner

CROSSHEAD FOR A PISTON ROD

BACKGROUND

Embodiments disclosed herein relate to a crosshead for a piston rod, specifically in a reciprocating compressor.

In the technical field of reciprocating machines (i. e. machines having a piston moving inside a cylinder such as, for example, internal combustion engines) the piston is usually connected to a crankshaft directly via a connecting rod. Specifically, the connecting rod is linked to the crankshaft via a crankpin. In this arrangement, however, the sideways forces from the connecting rod are transmitted directly to the piston, as the crankpin (and thus the direction the force is applied) moves from side to side with the rotary motion of the crankshaft.

These transverse forces are tolerable in a smaller reciprocating machine. However, in a larger one, such as for example a large reciprocating compressor, this would result in much greater forces, consequently causing an intolerable degree of wear on the piston and cylinder, as well as increasing overall friction.

Therefore, it becomes necessary to decouple the transverse movement of the crankpin from the axial movement of the piston. To perform this function, a crosshead links a piston rod (which is part of the piston) with a connecting rod (which is linked to the crankshaft via the crankpin). The sideways forces transmitted by the connecting rod are absorbed by the crosshead itself, thus allowing the piston rod to move along its axis with negligible transverse load.

Such crosshead is known in the state of the art. The crosshead comprises a main body having a first end facing the crankshaft and a second end facing the piston. A connecting rod is hinged on the first end, thus connecting it to the crankshaft. A piston rod is attached to the second end. Specifically, the piston rod is engaged into a receptacle of a flange, and it is retained therein primarily by mechanical interference. The flange itself is bolted onto the second end of the main body. Additionally, crosshead is provided with sliding shoes attached to the main body and slidably engaged on an internal wall of the cylinder. The sliding shoes themselves absorb the above mentioned sideway forces, allowing the crosshead to maintain the alignment with respect to the longitudinal axis of the piston.

An aspect of the prior art crosshead is that it is particularly prone to failure on the flange, as critical stresses can build up in the flange, especially on the fillet area near the bolting holes.

BRIEF DESCRIPTION

A first embodiment relates to a crosshead for a piston rod comprising a main body. The main body has a first and a second seat in order to hold a connecting rod and a piston rod respectively. The main body is made as a single piece.

This embodiment achieves several advantages over the prior art. Indeed, making the main body in a single piece allows to redesign the areas which are prone to failure in the prior art crosshead in such a way so that it is no longer the same. Indeed, the design limitations of the prior art crosshead can thus be completely overcome.

Also, the number of components is reduced, along with their complexity. This simplifies the assembly of the crosshead.

BRIEF DESCRIPTION OF THE DRAWINGS

Further details and specific embodiments will refer to the attached drawings, in which.

DETAILED DESCRIPTION

Figure 1:
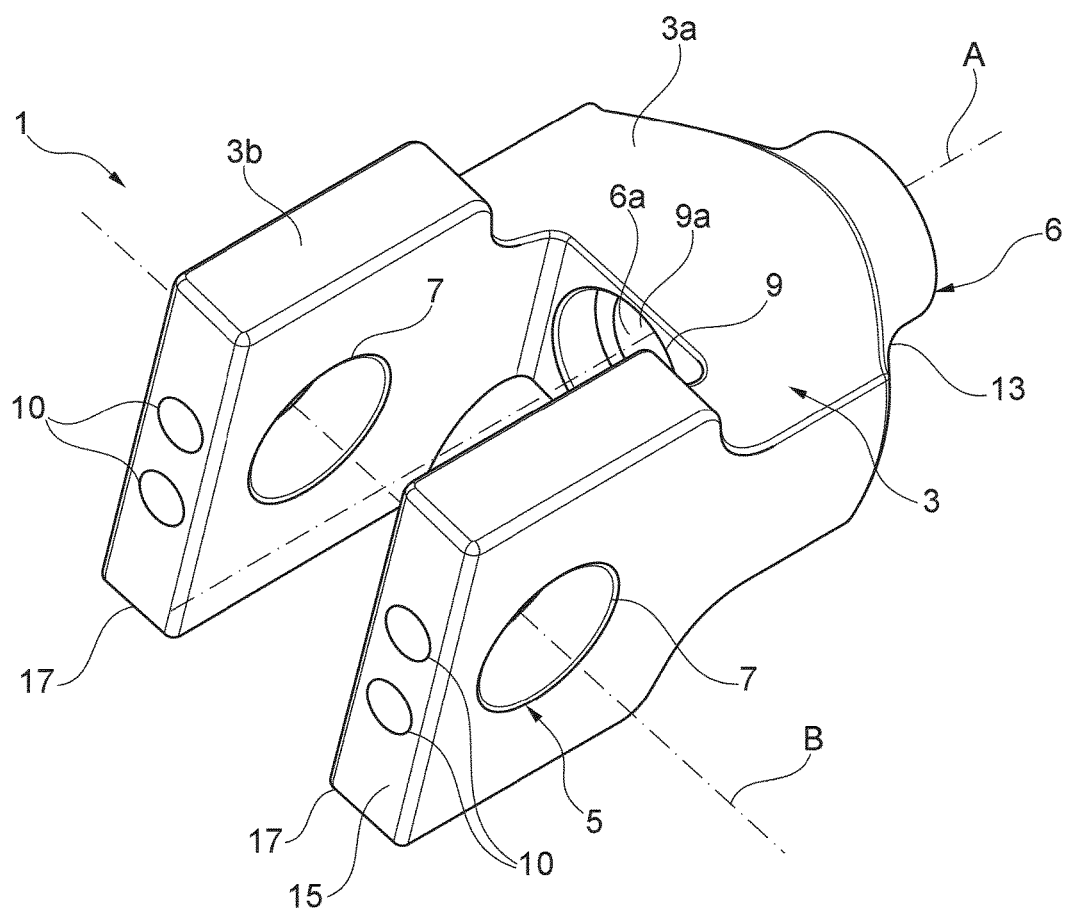
FIG. 1 is a perspective view of a crosshead according to a first embodiment.

The following description of exemplary embodiments refer to the accompanying drawings. The same reference numbers in different drawings identify the same or similar elements. The following detailed description does not limit the application. Instead, the scope of the application is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

With reference to the attached figures, with the number 1 is indicated a crosshead for a piston rod according to an embodiment.

The crosshead 1 has the purpose of connecting comprises a main body 3. The main body 3 is used to link a connecting rod 2 with a piston rod 4, as shown for example in FIG. 2.

Indeed, the main body 3 has a first 5 and a second seat 6. The first seat 5 is configured to hold the connecting rod 2. The second seat 6 is configured to hold the piston rod 4. In an embodiment, the first 5 and the second seat 6 are positioned on opposite ends of the main body 3. With more detail, the main body 3 has a front portion 3a and a back portion 3b. The first seat 5 is located on the back portion 3b, the second seat 6 is located on the front portion 3a.

The main body 3 has a longitudinal axis "A", along which the first 5 and the second seat 6 are substantially aligned i,e longitudinal axis "A, first 5 and the second seat 6 are on same plane. Indeed, the longitudinal axis "A" is the longitudinal axis of the piston rod 4. In other words, the longitudinal axis "A" identifies the direction along which the crosshead 1 moves during normal functioning. The main body 3 also has a hinge axis "B" in the first seat 5, around which the connecting rod 2 can rotate. The hinge axis "B" is perpendicular to the longitudinal axis "A".

The main body 3 has a front surface 13. For the purpose of the present disclosure, the front surface 13 is the surface of the crosshead 1 that, in use, faces the piston. In a first embodiment, shown in FIGS. 1 and 2, the front surface 13 is smooth. In a second embodiment, shown in FIGS. 3 and 4, the above mentioned front surface 13 has two recesses 16, opposite to each other with respect to the longitudinal axis "A". The purpose of the recesses 16 will be better explained in a following part of the present disclosure.

The main body 3 has also a back surface 15. Such back surface 15 is in particular opposite to the front surface 13. In other words, in use the back surface 15 faces the crankshaft.

It is to be noted that the main body 3 is made as a single piece. In other words, the main body 3 is not made of separate pieces, but is a single, continuous entity. With more detail, the main body 3 is continuous at least between the first 5 and the second seat 6. In use, the loads between the piston rod 4 and the connecting rod 2 are transferred primarily through the main body 3.

With detail, the above mentioned first seat 5 is designed to provide a way to link the crosshead 1 to the connecting rod. In order to achieve this purpose, the main body 3 is provided with two holes 7 which can hold a pin 12. The two holes 7 are coaxial. Indeed, the above mentioned hinge axis "B" is defined by the axis of the holes 7. As discussed above, according to an embodiment, the pin 12 can be inserted in a further hole (not shown) of the connecting rod 2.

The first seat 5 comprises two holes 7 for a pin 12. Indeed, the main body 3 is provided with at least one receptacle 10 for each hole 7. In an embodiment, the main body 3 is provided with at two receptacles 10 for each hole 7. This is to allow locking of the pin 12 into the hole 7. In an embodiment, this operation is performed using studs 11, as shown in FIG. 2.

Figure 2:
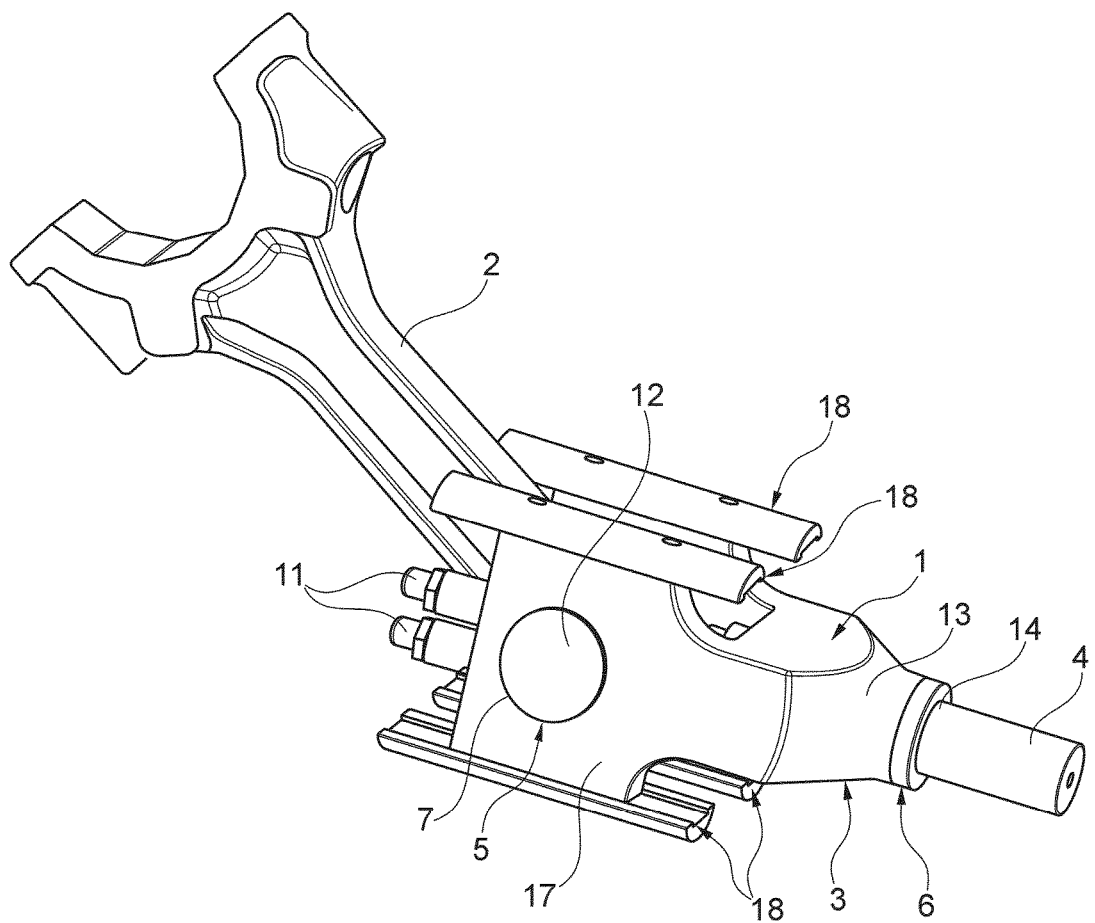
FIG. 2 is a perspective view of a crosshead according to the embodiment of FIG. 1 in an operating condition, also showing a piston rod and a connecting rod.
Figure 3:
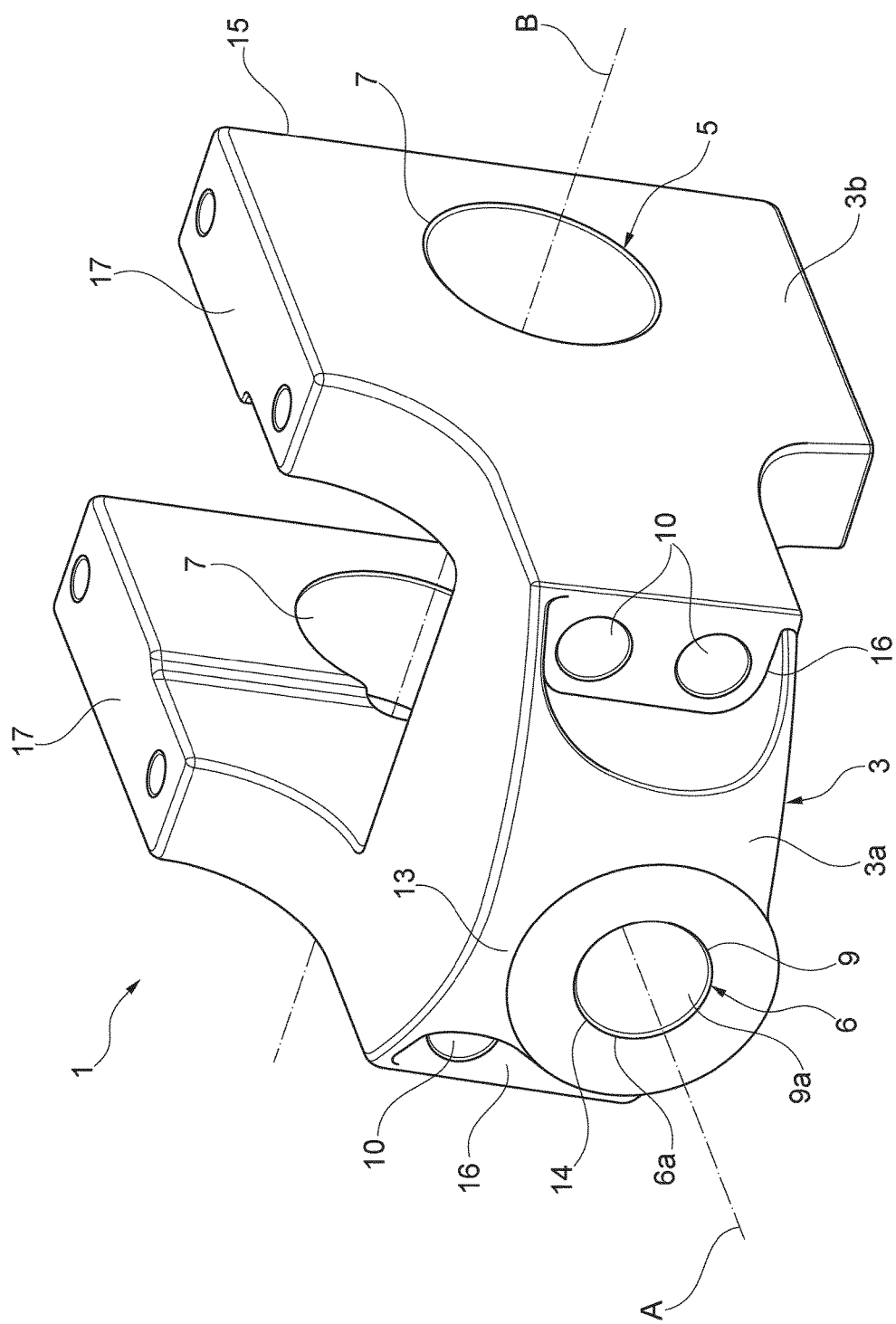
FIG. 3 is a perspective view of a crosshead according to a second embodiment.

It is to be noted that in the embodiment from FIGS. 1 and 2 the receptacles 10 located on the back surface 15, as described above. In the embodiment from FIGS. 3 and 4, the receptacles 10 are located on the front surface 13.

The above mentioned second seat 6 has a lateral surface 6a configured to engage the piston rod 4. Indeed, the lateral surface 6a of the second seat 6 extends at least along the aforementioned longitudinal axis "A". In other words, the lateral surface 6a develops around the longitudinal axis "A". According to the embodiment shown in FIG. 1, the lateral surface 6a is substantially cylindrical. With greater detail, the second seat 6 is formed as a bore 9 in the main body 3. Specifically, the bore 9 develops along the longitudinal axis "A" of the main body 3. The bore 9 has an internal surface 9a defining the lateral surface 6a of the second seat 6.

With additional detail, the bore 9 has an opening 14 on the front surface 13 of the main body 3. In the embodiment from FIGS. 3 and 4, the opening 14 of the bore 9 is placed between the recesses 16.

Also, the piston rod 4 has an engagement surface (not shown) configured to contact the at least in part the lateral surface 6a of the second seat 6. In an embodiment, shown in FIG. 1, the lateral surface 6a is a cylindrical surface. In this embodiment, the engagement surface of the piston rod 4 will also be cylindrical.

The back portion 3b of the main body 3 comprises two branches 17. Each branch is connected to the front portion 3a of the main body 3. Indeed, each branch 17 bears a respective hole 7 for the pin 12 described above. Thus the second seat is defined between the branches 17 of the back portion 3b.

According to the embodiments, the branches 17 have the shape of thick plates, which are parallel to each other and equidistant from the longitudinal axis "A". In an embodiment, each branch 17 has a thickness of comprised between 22 to 25% of total width of the crosshead 1.

It is also to be noted that the branches 17 are not connected to each other directly. Indeed, they fork from the front portion 3a of the main body 3 without otherwise joining one another directly.

The crosshead 1 also comprises sliding shoes 18 attached to the main body 3 and designed to allow a reciprocating movement along the longitudinal axis "A".

Figure 4:
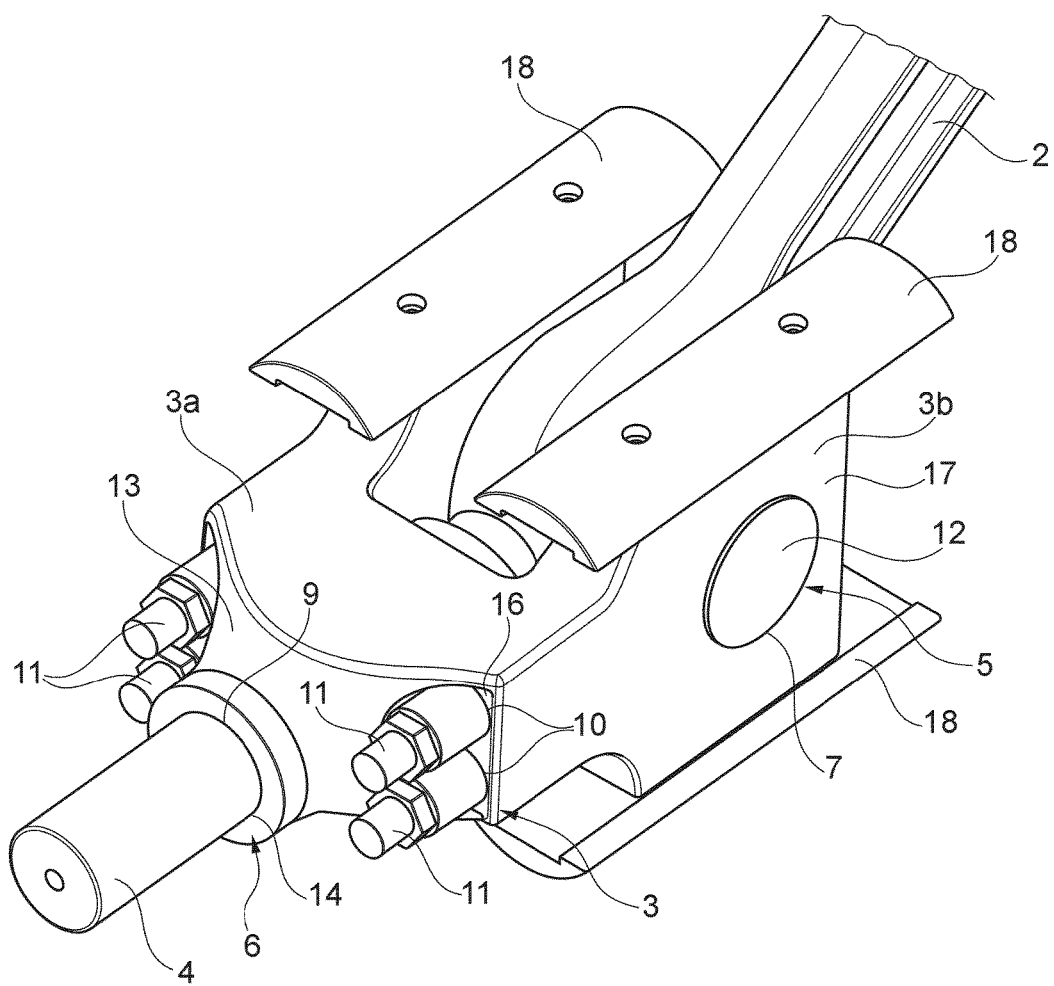
FIG. 4 is a perspective view of a crosshead according to the embodiment of FIG. 3 in an operating condition, also showing a piston rod and a connecting rod.

According to several embodiments, the crosshead 1 comprises four shoes 18. Each shoe is connected to one of the branches 17 of the back portion 3b of the main body 3. Such embodiments are shown in FIGS. 2 and 4.

Figure 5:
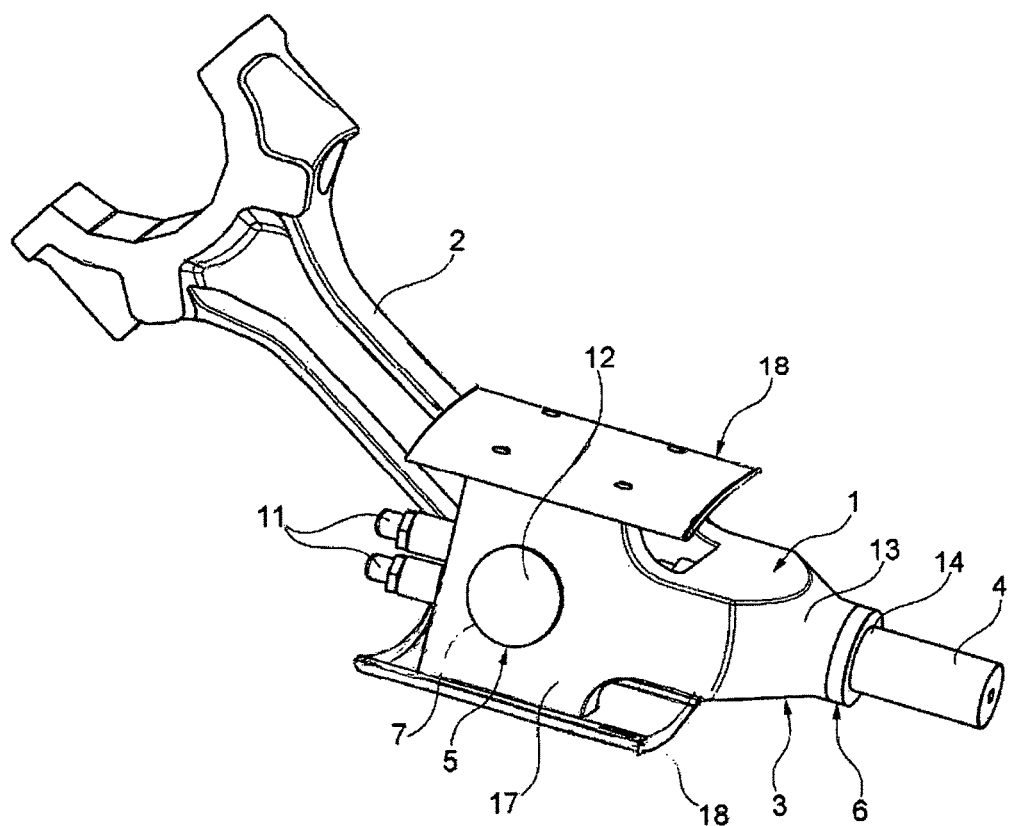
FIG. 5 is a perspective view of an embodiment of the crosshead shown in FIG. 2.

According to other embodiments, shown, for example, in FIG. 5, the crosshead 1 comprises only two shoes 18. In this case, each shoe is connected to both branches 17. In other words, in these embodiments the shoes 18 bridge the two branches 17 of the back portion 3b.

The sliding shoes 18 themselves will not be further described, as they are known to the person skilled in the art.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

The invention claimed is:

1. A crosshead for a piston rod, comprising:
 a main body, made as a single piece, said main body comprising:
  a first and a second seat, said first seat configured to hold a connecting rod and said second seat configured to hold a piston rod;
  a front portion and a back portion, the back portion comprising two branches connected to the front portion, each branch having a thickness of between 22 to 25% of the total width of the crosshead and defining a respective hole for a pin,
  wherein said first seat is located on the back portion and said second is located on the front portion.

2. The crosshead according to claim 1, wherein said second seat is a bore through said main body, said bore having a central axis defining a longitudinal axis of said main body.

3. The crosshead according to claim 2, wherein said main body has a front surface, said bore having an opening on said front surface.

4. The crosshead according to claim 3, wherein said front surface is smooth.

5. The crosshead according to claim 2, wherein said bore has an internal surface configured to contact said piston rod.

6. The crosshead according to claim 1, wherein said first seat comprises two holes for a pin, the main body being provided with at least one receptacle for each hole to allow locking of said pin into the respective hole.

7. The crosshead according to claim 6, wherein said at least one receptacle is located on a front surface of the main body or on a back surface of the main body.

8. The crosshead according to claim 1, wherein said branches are not connected directly.

9. The crosshead according to claim 8, further comprising two shoes, each shoe being connected to both branches.

10. The crosshead according to claim 8, further comprising four shoes, each shoe being connected to one of said branches.

11. The crosshead according to claim 1, further comprising two shoes, each shoe being connected to both branches.

12. The crosshead according to claim 1, further comprising four shoes, each shoe being connected to one of said branches.

13. A crosshead for a piston rod, comprising:
a main body, made as a single piece, said main body comprising:
  a first and a second seat, said first seat configured to hold a connecting rod and said second seat configured to hold a piston rod;
  a front portion and a back portion, the back portion comprising two branches connected to the front portion, each branch defining a respective hole for a pin,
  wherein said first seat is located on the back portion and said second is located on the front portion; and
two shoes, each shoe connected to both branches.

14. The crosshead according to claim 13, wherein said branches are not connected directly.

15. The crosshead according to claim 13, wherein said second seat is a bore through said main body, said bore having a central axis defining a longitudinal axis of said main body.

16. The crosshead according to claim 15, wherein said bore has an internal surface configured to contact said piston rod.

17. The crosshead according to claim 15, wherein said main body has a front surface, said bore having an opening on said front surface.

18. The crosshead according to claim 17, wherein said front surface is smooth.

19. The crosshead according to claim 13, wherein said first seat comprises two holes for a pin, the main body being provided with at least one receptacle for each hole to allow locking of said pin into the respective hole.

20. The crosshead according to claim 19, wherein said at least one receptacle is located on a front surface or on a back surface of the main body.

* * * * *